(12) United States Patent
Rivoir

(10) Patent No.: US 12,049,396 B2
(45) Date of Patent: Jul. 30, 2024

(54) PANTOGRAPH-TYPE LIFTING SYSTEM

(71) Applicant: LHD S.P.A., Bruino (IT)

(72) Inventor: Giuliano Rivoir, Bruino (IT)

(73) Assignee: LHD S.P.A., Bruino (IT)

( * ) Notice: Subject to any disclaimer, the term of this patent is extended or adjusted under 35 U.S.C. 154(b) by 263 days.

(21) Appl. No.: 17/767,081

(22) PCT Filed: Sep. 28, 2020

(86) PCT No.: PCT/IT2020/050236
§ 371 (c)(1),
(2) Date: Apr. 7, 2022

(87) PCT Pub. No.: WO2021/079391
PCT Pub. Date: Apr. 29, 2021

(65) Prior Publication Data
US 2022/0363525 A1 Nov. 17, 2022

(30) Foreign Application Priority Data
Oct. 25, 2019 (IT) .......................... 102019000019803

(51) Int. Cl.
*B66F 7/06* (2006.01)
*B66F 7/28* (2006.01)
(Continued)

(52) U.S. Cl.
CPC ................ *B66F 7/28* (2013.01); *B66F 7/065* (2013.01); *A61G 3/062* (2013.01); *B60P 1/4414* (2013.01)

(58) Field of Classification Search
CPC .................................. B66F 7/28; B66F 7/065
See application file for complete search history.

(56) References Cited

U.S. PATENT DOCUMENTS

| 4,288,195 A * | 9/1981 | Brewer | B66F 7/08 187/269 |
| 5,111,912 A * | 5/1992 | Kempf | B61D 23/00 187/250 |

(Continued)

FOREIGN PATENT DOCUMENTS

| AU | 2016101849 A4 * | 12/2016 |
| DE | 20220252 U1 | 4/2003 |

OTHER PUBLICATIONS

Titan LHD Load Handling Devices (Year: 2024).*
(Continued)

*Primary Examiner* — Mahdi H Nejad
(74) *Attorney, Agent, or Firm* — Hinckley Allen & Snyder; Stephen Holmes

(57) ABSTRACT

A pantograph-type lifting system comprises a base; a platform connected to the base by a pair of levers each comprising a first lever and a second lever mutually hinged in a fulcrum, the first lever having a lower end hinged to the base, and an upper end sliding connected to the platform, the second lever having a lower end sliding connected to the base, and an upper end hinged to the platform in a fixed spot; a chain-type actuating system of the levers comprising one chain meshed with a first toothed pulley and with a second toothed pulley rotatable connected to the respective levers, the chain-type actuating system being configured to transfer the motion from motor means to the levers through the toothed pulleys in order to approach or move away the ends of the levers with a scissors-like movement to lift or lower the platform.

7 Claims, 5 Drawing Sheets

(51) Int. Cl.
    *A61G 3/06*          (2006.01)
    *B60P 1/44*          (2006.01)

(56) References Cited

U.S. PATENT DOCUMENTS

| | | | | |
|---|---|---|---|---|
| 5,395,209 | A * | 3/1995 | Busse | B66F 7/02 |
| | | | | 187/269 |
| 6,779,635 | B1 * | 8/2004 | Anibas | B66F 7/0633 |
| | | | | 187/214 |
| 11,679,966 | B2 * | 6/2023 | Rosencrance | B66F 7/0633 |
| | | | | 187/211 |
| 2011/0262261 | A1 * | 10/2011 | Stewart | B66F 7/0625 |
| | | | | 414/800 |
| 2020/0282893 | A1 * | 9/2020 | Weinmeister | B60P 1/4442 |
| 2021/0354633 | A1 * | 11/2021 | Cowan | A47B 46/005 |

OTHER PUBLICATIONS

Titan Scissor Lift DataSheet (Year: 2024).*
Scissor Lift mod. Titan + ARES 70 SD Telescopic Forks @ Chinese Battery Swap Station | LHD S.p.A. found at: https://www.youtube.com/watch?v=Xt2h4Zp7Xc8 (Year: 2019).*
Scissor Lift mod. Titan + ARES 80 SD Telescopic Forks (test run) | LHD S.p.A. found at: https://www.youtube.com/watch?v=kWfXPICuWuE&t=2s (Year: 2020).*
Titan Scissor Lift—Patented LHD founded at: https://www.youtube.com/watch?v=HbVvAbvoHbA (Year: 2022).*

* cited by examiner

PANTOGRAPH-TYPE LIFTING SYSTEM

The present invention refers to a pantograph-type lifting system, also known as scissors-like lifting system, in particular for handling boxes of various loads in the field of automatic warehouses, in motor vehicle line and in various other fields.

More in particular, the invention refers to a pantograph-type lifting system, associated with a telescopic system to store or withdraw containers in shelving or from conveyors.

Pantograph-type lifting systems are known in the art, comprising for example hydraulic or belt-type actuating means driven by motor means, for example electric motoreducers which are installed on the pantograph-type lifting system.

Known pantograph-type lifting systems suffer many inconveniences, as regards their relevant weight, their overall sizes and their dangerous actuating means, in particular the hydraulic actuating means, and the high power required to drive them.

Object of the present invention is solving the above prior art problems by providing a pantograph-type lifting system which has reduced weight and overall sizes, in order to require a minimum effort for the motors and which is at the same time reliable and with a reduced cost.

Another object of the invention is providing a pantograph-type lifting system which allows lifting loads which are not barycentric. The known system has their gravitational center always in the perimeter of the pantograph.

The above and other objects and advantages of the invention, as will result from the following description, are obtained with a pantograph-type lifting system as claimed in the independent claim.

Preferred embodiments and non-trivial variations of the present invention are the subject matter of the dependent claims.

It is intended that the enclosed claims are an integral part of the present description.

It will be immediately obvious that numerous variations and modifications (for example related to shape, sizes, arrangements and parts with equivalent functionality) could be made to what is described, without departing from the scope of the invention, as included in the enclosed claims.

The present invention will be better described by some preferred embodiments thereof, provided as a non-limiting example, with reference to the enclosed drawings, in which.

Figure 1:
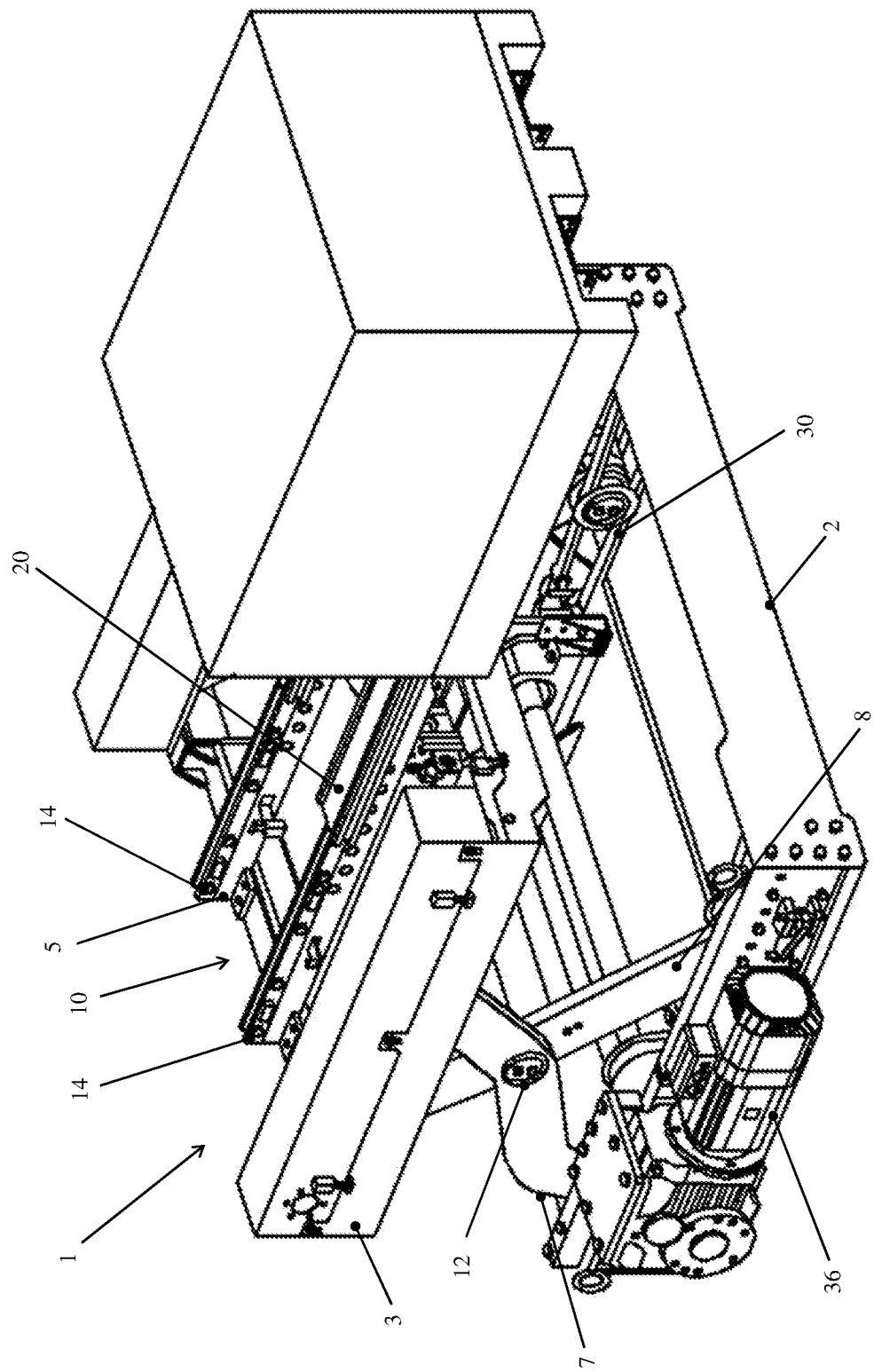
FIG. 1 shows a perspective view of a pantograph-type lifting system according to the invention.
Figure 2:
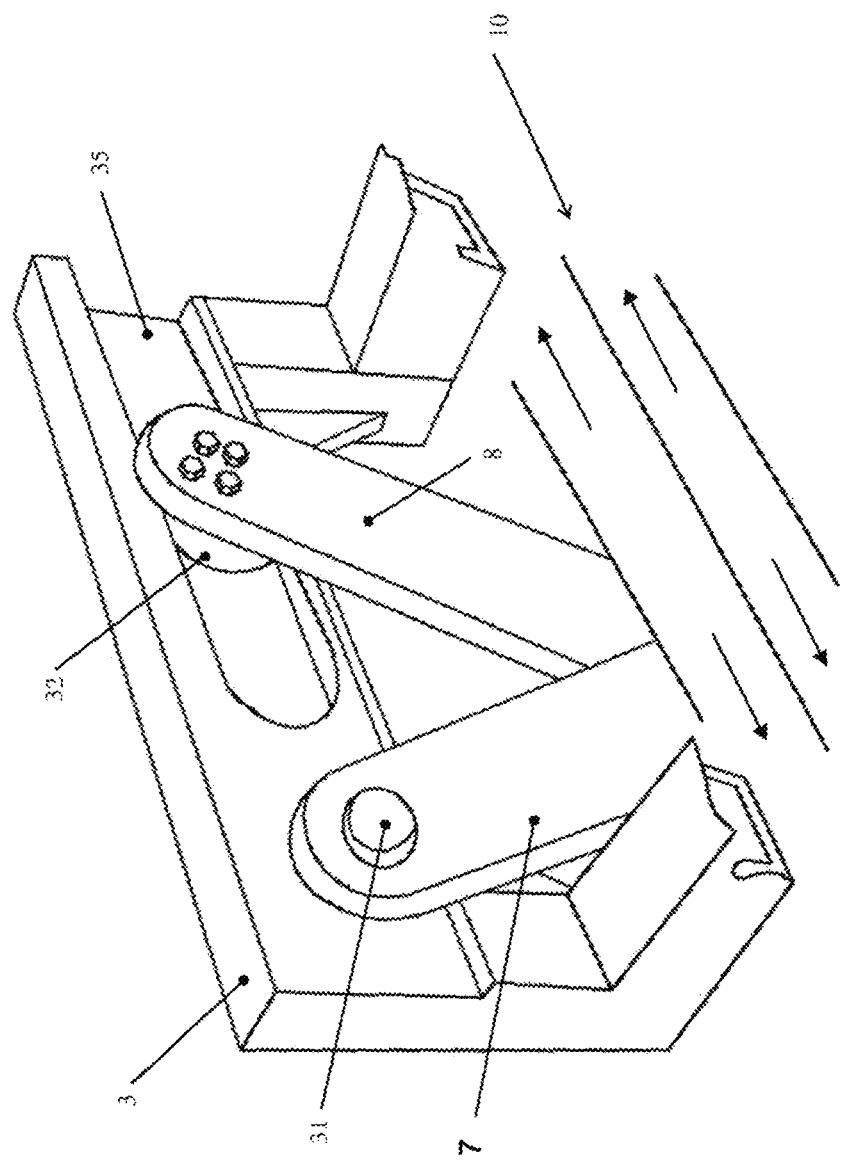
FIG. 2 shows a perspective view of an enlarged part of a pantograph-type lifting system according to the invention.

With reference to the Figures, a preferred embodiment of the pantograph-type lifting system 1, also called scissors-type lifting system, according to the present invention is shown and described, and comprises a base 2 and a platform 3 connected to the base 2 by means of a pair of levers, each comprising a first lever 7 and a second lever 8 mutually hinged in a fulcrum 12 placed in an intermediate position with respect to said levers 7, 8.

The first lever 7 has a lower end hinged to the base 2 in a fixed spot, and an upper end sliding connected to the platform 3, and the second lever 8 has a lower end sliding connected to the base 2, and an upper end hinged to the platform 3 in a fixed spot.

For example, the lower end of the first lever and the upper end of the second lever 8 are hinged to the base 2 and to the platform 3 respectively, in a fixed pin 31, while the upper end of the first lever 7 and the lower end of the second lever 8 are hinged respectively to the platform 3 and to the base 2, at a sliding pin 32 on a guide 35, for example a slit 35 obtained on the respective platform 3 and base 2.

The pantograph-type lifting system 1 of the invention further comprises a telescopic fork 10 of a known type arranged on the platform 3 and comprising a fixed base 5 and at least one slider, or withdrawing element, 20 telescopically sliding with respect to the fixed base 5 on a series of rollers 14 with horizontal axis, connected to the base and/or to the slider 20, which support said at least one slider 20 configured to deposit containers inside a shelving or on conveyors, or to withdraw the containers, following a movement of the slider 20.

The pantograph-type lifting system 1 according to the invention further comprises actuating means of the sliders 20 of a known type, for example comprising chain and/or rack mechanisms configured to transfer the motion from motor means to sliders 20.

Preferably, the pantograph-type lifting system 1 according to the present invention comprises two telescopic forks 10 arranged side by side, configured to support a container or a pallet to be deposited in a shelving or on conveyors, or to withdraw the container or pallet. The system can be assembled on shuttles, translating devices, lifting/lowering devices, AGV, etc.

The pantograph-type lifting system 1 according to the invention further comprises a chain-type actuating system 40 of the levers 7, 8 comprising at least one chain 30 meshed with a first toothed pulley 33 and with a second toothed pulley 34 rotatable connected to the respective levers 7, 8, said chain-type actuating system 40 being configured to transfer the motion from motor means 36 of a known type, for example electric motor-reducers, to the levers 7, 8 through said toothed pulleys 33, 34, in order to approach or move away the ends of the levers 7, 8 with a scissors-like movement and consequently lift or lower the platform 3.

Preferably, the first toothed pulley 33 is connected to the lower end of the first lever 7, and the second toothed pulley 34 is connected to the lower end of the second lever 8 next to the respective fixed pin 31 and sliding pin 32 for a connection to the base 2; in a preferred way, the toothed pulleys 33, 34 are connected to the respective pins 31, 32 rotatable connected to the levers 7, 8.

Preferably, said pin 31, 32 is a shaft connected to the toothed pulleys 33, 34, in turn connected rotating to the lower ends of two first levers 7 and/or of two second levers 8, which belong to two different pairs of levers, said shaft being connected to the motor means 36 through actuating means of a known type, configured to transmit the rotary motion from the motor means 36 to the pins 31, 32 and to the toothed pulleys 33, 34.

In particular, the chain 30 meshed with the toothed pulleys 33, 34 comprises a first end connected to a fixed spot 41 and a second end connected to a tensioner 42 connected to the base 2 and comprising elastic means configured to keep the chain 30 tensioned when the rotary motion of the toothed pulleys 33, 34, and the consequent advancement of the chain 30, cause an approach or an away movement of the ends of the levers 7, 8 with a scissors-like movement, to lift or lower the platform 3.

When operating, the rotation of the toothed pulleys 33, 34 along a first direction, for example counter-clockwise, causes an advancement of the chain 30 which generates an approach of the ends of the levers 7, 8, with the consequent lifting of the platform 3, while the rotation along the opposite direction generates an away movement of the ends of the levers 7, 8, and the lowering of the platform 3.

Figure 3:
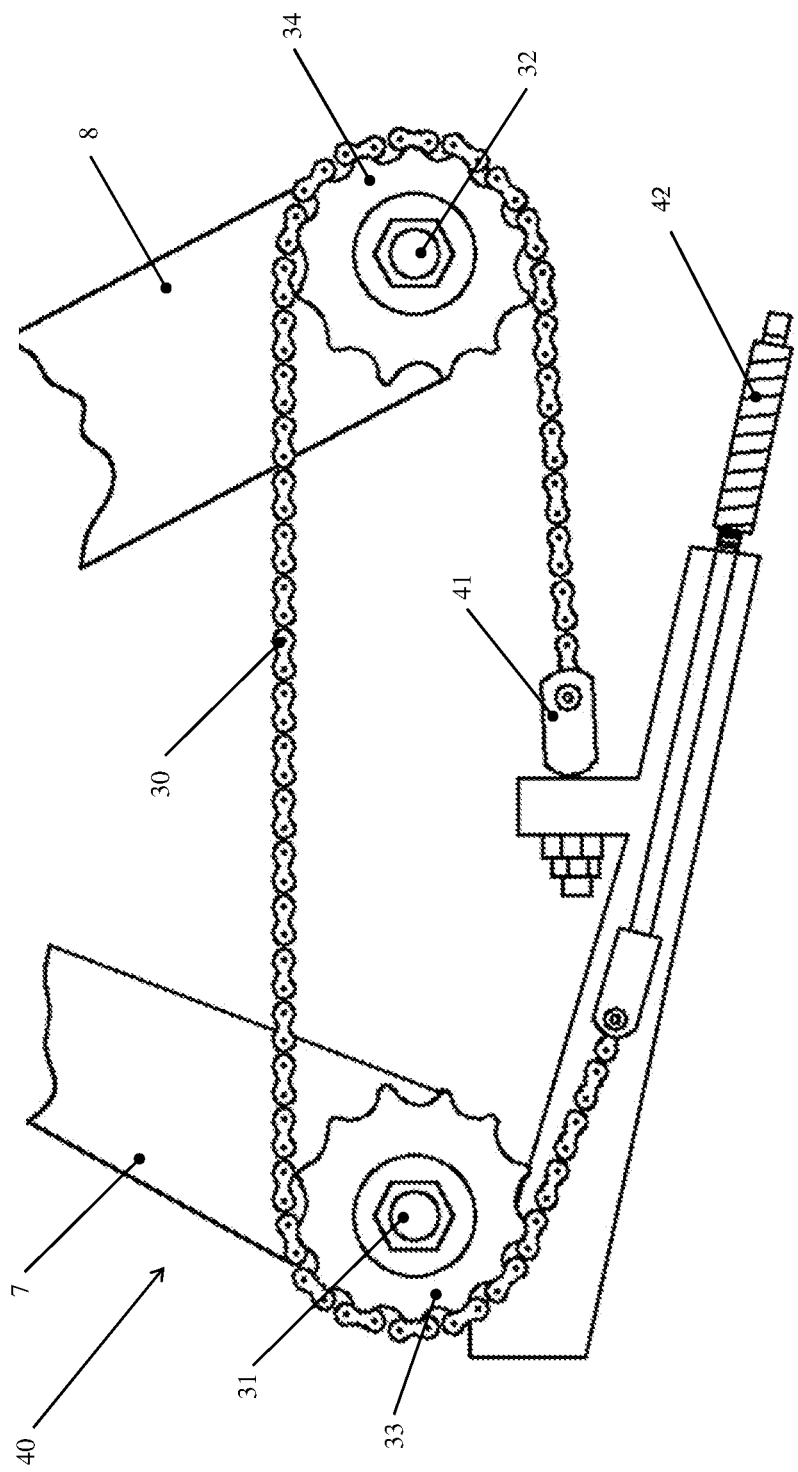
FIG. 3 shows a schematic view of an actuating system of the pantograph-type lifting system according to the invention.
Figure 4:
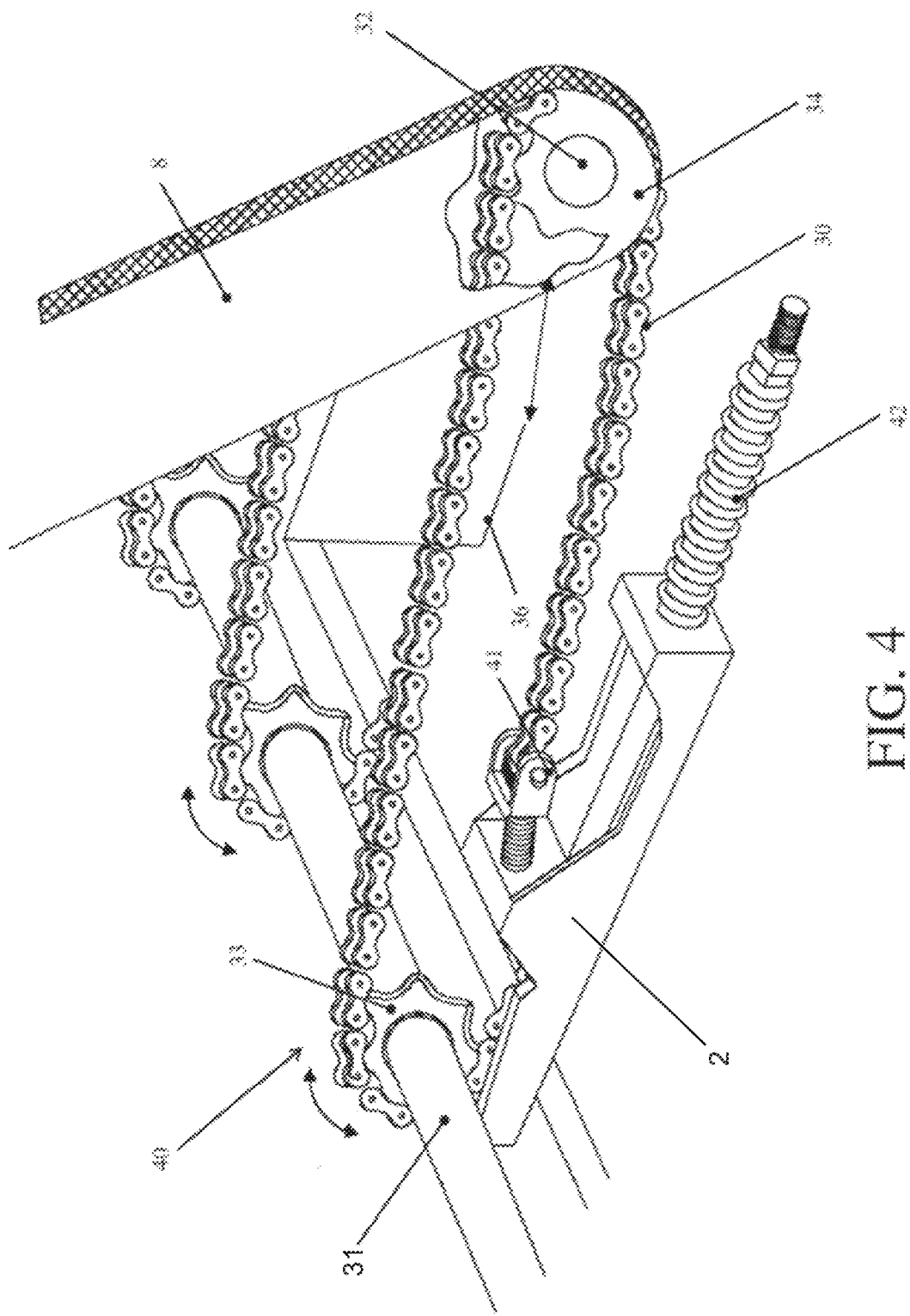
FIG. 4 shows a perspective view of an enlarged part of the actuating system of FIG. 3.
Figure 5:
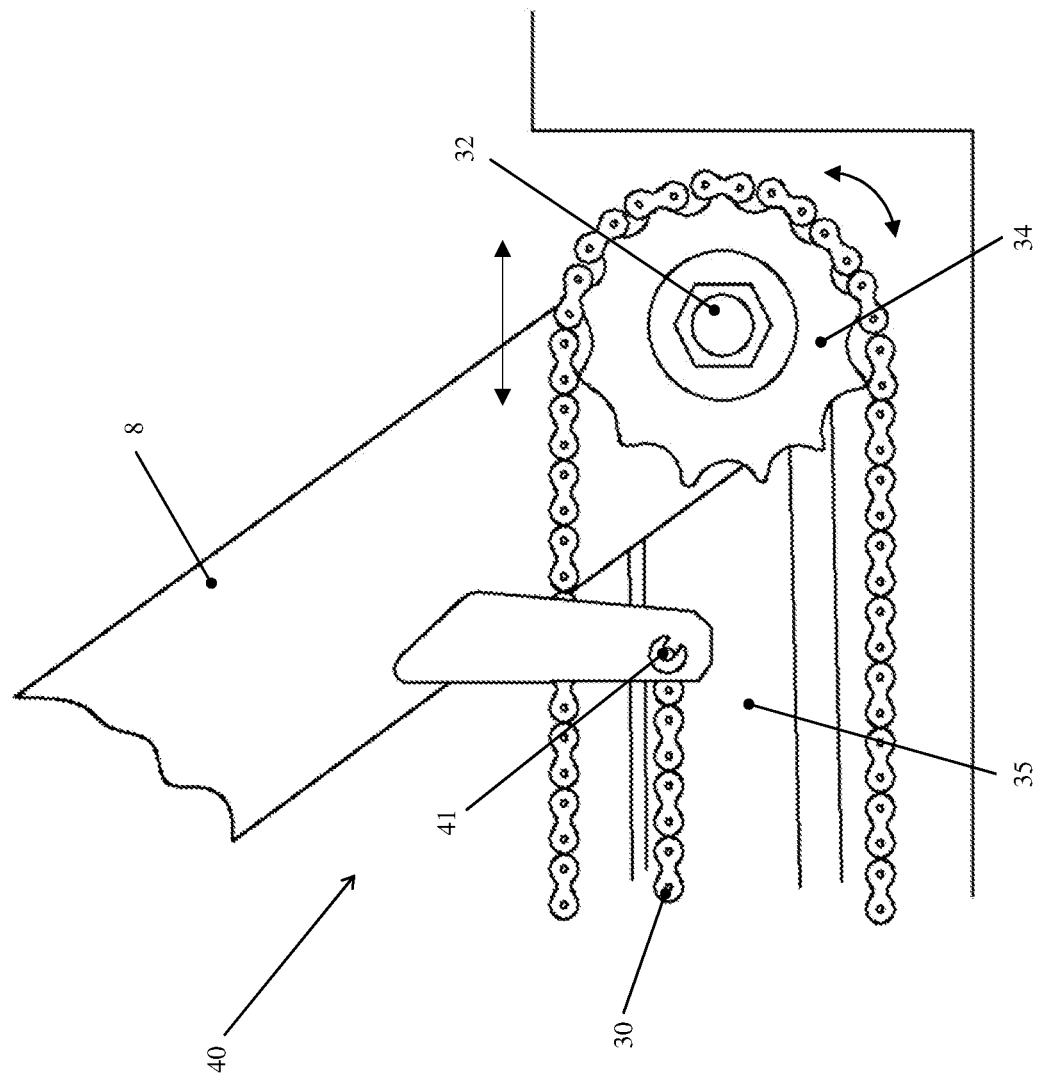
FIG. 5 shows a schematic view of the actuating system of the pantograph-type lifting system according to the invention.

In a first embodiment of the pantograph-type lifting system 1 according to the invention, shown in FIGS. 3 and 4, the fixed spot 41 is fastened to the base 2, and in a second embodiment of the pantograph-type lifting system 1 according to the invention, shown in FIG. 5, the fixed spot 41 is fastened to the second lever 8, next to its lower end sliding connected to the base 2.

The pantograph-type lifting system 1 according to the invention further comprises a control system of the motor means, of the position or of the end-of-stroke of the slider 20, of the levers 7, 8 and of the toothed pulleys 33, 34, comprising logic control unit, also known.

Advantageously, the pantograph-type lifting system 1 of the invention allows obtaining a system with a very small weight and overall sizes, in order not to require an excessive effort to the motors, which is reliable and has a reduced cost; moreover, the pantograph-type lifting system 1 of the invention, due to the forks 10, is capable of lifting a load which is not barycentric.

The invention claimed is:

1. A pantograph-type lifting system (1) comprising:
a base (2);
a platform (3) connected to the base (2) by means of a pair of levers, each comprising a first lever (7) and a second lever (8) mutually hinged in a fulcrum (12) placed in an intermediate position with respect to said levers (7, 8), said first lever (7) having a lower end hinged to a fixed position on the base (2), and an upper end slidably connected to the platform (3), said second lever (8) having a lower end slidably connected to the base (2), and an upper end hinged to a fixed position on the platform (3);
a chain-type actuating system (40) of the levers (7, 8) comprising at least one chain (30) meshed with a first toothed pulley (33) and with a second toothed pulley (34) rotatably connected to the respective levers (7, 8), said chain-type actuating system (40) being configured to transfer a rotary motion from motor means (36) to the levers (7, 8) through said toothed pulleys (33, 34) in order to approach or move away the ends of the levers (7, 8) with a scissors-like movement to lift or lower the platform (3),
wherein the at least one chain (30) meshed with the toothed pulleys (33, 34) comprises a first end connected to a fixed spot (41) on the second lever (8) next to the lower end thereof which is slidably connected to the base (2), and a second end connected to a tensioner (42), said tensioner (42) connected to the base (2), said tensioner (42) comprising elastic means configured to keep the at least one chain (30) tensioned when a rotary motion of the toothed pulleys (33, 34), and the consequent advancement of the at least one chain (30), cause an approach or away movement of the ends of the levers (7, 8) with a scissors-like movement, to lift or lower the platform (3).

2. The pantograph-type lifting system (1) according to claim 1, wherein the lower end of the first lever (7) and the upper end of the second lever (8) are hinged to the base (2) and to the platform (3) respectively, in a fixed pin (31), while the upper end of the first lever (7) and the lower end of the second lever (8) are hinged respectively to the platform (3) and to the base (2), at a sliding pin (32) on a guide (35) obtained on the respective platform (3) and base (2).

3. The pantograph-type lifting system (1) according claim 2, wherein said pins (31, 32) is a shaft comprise shafts connected to the toothed pulleys (33, 34), in turn rotatably connected to the lower ends of the two first levers (7) and of two second levers (8), which belong to two different pairs of levers, said shafts being rotatable by the motor means (36) and being configured to transmit the rotary motion from the motor means (36) to the toothed pulleys (33, 34).

4. The pantograph-type lifting system (1) according to claim 1, wherein the first toothed pulley (33) is connected to the lower end of the first lever (7), and the second toothed pulley (34) is connected to the lower end of the second lever (8) next to the respective fixed pin (31) and sliding pin (32) for a connection to the base (2).

5. The pantograph-type lifting system (1) according to claim 1, wherein the toothed pulleys (33, 34) are connected to the respective pins (31, 32) rotatably connected to the levers (7, 8).

6. The pantograph-type lifting system (1) according to claim 1, further comprising at least one telescopic fork (10) arranged on the platform (3) and comprising a fixed base (5) and at least one slider (20) telescopically sliding with respect to the fixed base (5) on a series of rollers (14) which support said at least one slider (20) configured for depositing a container inside a shelving, or for withdrawing said container.

7. The pantograph-type lifting system (1) according to claim 6, wherein said at least one telescopic fork comprises two telescopic forks (10) arranged side by side, each respective telescopic fork configured to support a container or a pallet to be deposited in a shelving, or to extract the container or the pallet.

* * * * *